United States Patent Office 3,642,865
Patented Feb. 15, 1972

3,642,865
AMINO-BENZOIC ESTERS

Julius Diamond, Plymouth Meeting, Pa., and Gustav J. Martin, deceased, late of Philadelphia, Pa., by Dorothy Patricia Martin, administratrix, Philadelphia, Pa.; said Diamond assignor to William H. Rorer, Inc., Fort Washington, Pa.
No Drawing. Continuation-in-part of application Ser. No. 599,381, Dec. 6, 1966. This application Dec. 16, 1968, Ser. No. 791,533
Int. Cl. C07c 79/46, 101/62
U.S. Cl. 260—471 R          9 Claims

ABSTRACT OF THE DISCLOSURE

The amino-benzoic acid derivatives of this invention are useful in the treatment of pain and inflammation in mammals. Such derivatives manifest a particularly low degree of hemorrhage and ulceration while maintaining adequate salicylate blood levels for relatively high analgesic and anti-inflammatory activity.

---

This invention relates to new and useful improvements in amino-benzoic acid derivatives and the preparation thereof. The derivatives have the structural formula:

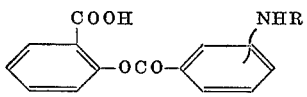

in which R is H or COCH₃. The derivatives are novel compounds having analgesic and anti-inflammatory activity for the treatment of mammals.

This application is a continuation-in-part of the copending application, Ser. No. 599,381, filed Dec. 6, 1966, now abandoned.

It is an object of this invention to provide such derivatives having high analgesic and anti-inflammatory activity in mammals.

It is a further object to provide such compounds of relatively low toxicity which produce a low degree of hemmorrhage and ulceration while maintaining adequate salicylate blood levels for high analgesic and anti-inflammatory activity.

With these and other objects in view, the nature of which will be apparent, the invention will be more fully understood by reference to the accompanying detailed description and the appended claims.

The following equations represent a method of producing compounds of this invention:

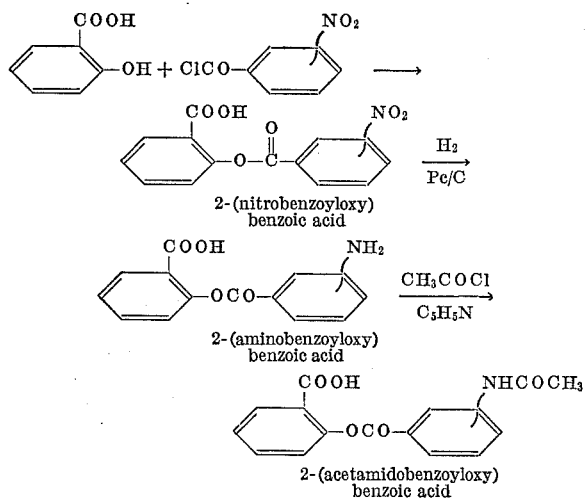

The first step in the method comprises reacting a nitrobenzoyl chloride with salicylic acid. This step may be conveniently achieved by dissolving the nitrobenzoyl chloride in an anhydrous inert solvent, such as dry benzene, and adding the resulting solution dropwise with agitation to a solution of salicylic acid also dissolved in the same or other inert organic solvent containing dry pyridine. Preferably, the temperature during the addition is maintained at 5 to 15° C. The mixture is agitated at room temperature for a period of about 40 hours, after which the precipitate is removed and washed with an organic solvent such as ether. Desirably, it is then suspended and stirred briefly in water, removed, such as by filtration, washed with water, and dried. The crude product is then desirably triturated with isopropanol to yield a relatively pure 2-(nitrobenzoyloxy) benzoic acid.

The relatively pure 2-(nitrobenzoyloxy) benzoic acid is then dissolved in N,N-dimethylformamide containing a small quantity of water and hydrogenated under pressure over palladium on charcoal. After the approximate theoretical amount of hydrogen is absorbed, the catalyst is filtered, and the filtrate is diluted with water. The resulting precipitate is collected on a filter, washed with water and dried, yielding a 2-(aminobenzoyloxy) benzoic acid. The 2-(aminobenzoyloxy) benzoic acid obtained is dissolved in dry pyridine. To the resulting solution is added acetyl chloride. After agitation for about 3 hours, the mixture is poured into ice-water and the solution acidified with hydrochloric acid to pH 2–3 to precipitate the corresponding 2-(acetamidobenzoyloxy) benzoic acid. Preferably, the crude product is digested with boiling acetone-ethyl acetate and reprecipitated from dimethylformamide and water.

Alternatively, the 2-(aminobenzoyloxy) benzoic acid may be produced in accordance with the following reaction scheme:

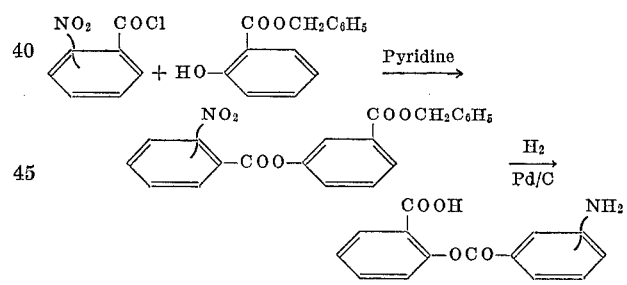

In this alternative process, salicylic acid is reacted with agitation with a nitrobenzoyl chloride. Conveniently, the benzyl salicylate is dissolved in dry pyridine. The temperature of the reaction mixture is allowed to rise spontaneously from about 20° to 60° C. and is agitated by stirring, for example, for about 2½ hours. It is then poured into ice-water and the resulting precipitate filtered and washed with water. The damp filter-cake is suspended and stirred in methanol, filtered, and washed with methanol. The reaction product is suspended in N,N-dimethylformamide containing a small quantity of water and hydrogenated over palladium on charcoal. After the theoretical amount of hydrogen is absorbed, the reaction mixture is filtered and the filtrate diluted with water to precipitate the crude 2-(amino-benzoyloxy) benzoic acid.

The crude 2-(aminobenzoyloxy) benzoic acid is purified by dissolving in boiling acetone treated with activated charcoal and filtered. The acetone may be removed from the filtrate by distillation from the filtrate while adding benzene at a rate to maintain a constant volume and until the boiling point of the mixture reaches 70–75° C. At this point, the pure product crystallizes out. The mixture is filtered, washed with benzene and dried at 50° C. in vacuo to yield the pure 2-(aminobenzyloxy)benzoic acid.

The 2-(aminobenzoyloxy) benzoic acids may be prepared by another process in accordance with the following representation:

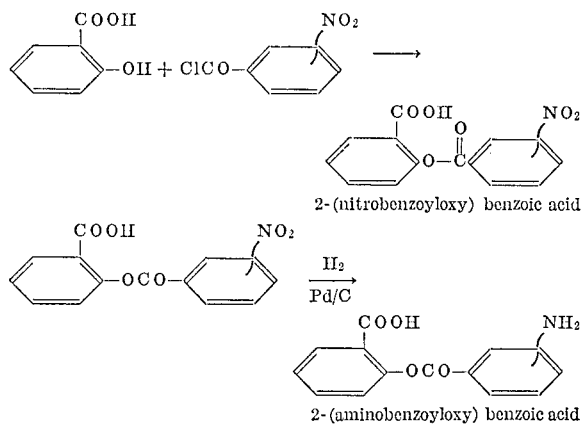

In this alternative process, salicylic acid is reacted with a nitrobenzoyl chloride. Desirably, the salicylic acid is dissolved in dry acetone containing a quantity of N,N-dimethylaniline and the nitrobenzoyl chloride is dissolved in dry acetone. Preferably, the solution of nitrobenzoyl chloride is added slowly while stirring the reaction mixture in a cold water bath. After a precipitate forms, the cold water bath is removed and stirring is continued for about 3½ hours. The dilute hydrochoric acid is then added with vigorous stirring while chilling the mixture in ice-water. The precipitate is filtered and washed successively with water and benzene.

The resulting 2-(nitrobenzoyloxy) benzoic acid suspended in acetone containing a small quantity of water and tartaric or citric acid is shaken with hydrogen over palladium on charcoal. The reduction is carried out under pressure. After the approximate theoretical amount of hydrogen is absorbed, the catalyst is filtered off and the filtrate diluted with water while stirring. The resulting 2-(aminobenzoyloxy) benzoic acid is washed successively with water and benzene.

A high yield of the 2-(nitrobenzoloxy) benzoic acids employed as intermediates in the production of the compounds of this invention may be produced by reacting an alkali metal salicylate such as sodium salicylate. Desirably, the alkali metal salicylate is suspended in dry acetone and the nitrobenzoyl chloride also dissolved in dry acetone is added slowly while stirring in a cold water bath. After about twenty minutes, the cold water bath is removed and stirring continued for about 16 hours at room temperature. A quantity of cold water is then added slowly with vigorous stirring. The precipitate of the desired 2-(nitrobenzoyloxy) benzoic acid formed is successively washed with water and benzene.

Any of the three 2-(aminobenzoyloxy) benzoic acids may be purified by dissolving the crude 2-(aminobenzoyloxy) benzoic acid in 10:1 acetone-water at about 35° C. The resulting solution is then filtered and diluted with water while stirring. The resulting precipitated product is filtered off and washed with water.

A more comprehensive understanding of this invention is obtained by reference to the following examples.

EXAMPLE I 2-(p-aminobenzoyloxy) benzoic acid and 2-(p-acetamidobenzoyloxy) benzoic acid A solution of 18.6 g. of p-nitrobenzoyl chloride in 100 ml. of dry benzene is added dropwise with stirring to 13.8 g. of salicylic acid in 150 ml. of dry benzene containing 20 ml. of dry pyridine, while the temperature is maintained at 5 to 10° C. The mixture is then stirred at room temperature for 40 hours, after which the precipitate is collected on a filter and washed with ether. It is then suspended and stirred briefly in water, collected on a filter, washed with water and dried, producing 18.2 g. of crude product melting at 188–201° C. Trituration with 50 ml. of isopropanol yields 16.7 g. of pure 2-(p-nitrobenzoyloxy) benzoic acid melting at 194–196° C.

16.1 g. of this product is dissolved in 100 ml. of N,N-dimethylformamide, containing 5 ml. of water and hydrogenated at 57 p.s.i.g./27° C. over 0.50 g. of 5% palladium charcoal. After 1½ hours 97% of the theoretical amount of hydrogen is absorbed. The catalyst is filtered off and the filtrate is diluted with 300 ml. of water. The precipitate is collected on a filter, washed with water and dried, yielding 12.3 g. of 2-(p-aminobenzoyloxy) benzoic acid, the first desired product. 38.5 g. (0.15 m.) of 2-(p-aminobenzoyloxy) benzoic acid is then dissolved in 120 ml. of dry pyridine. To this was added portionwise with stirring 26 g. (0.33 m.) of acetyl chloride, causing the temperature to rise spontaneously to 60° C. After stirring 3 hours, the mixture was poured into 1 liter of ice-water and the solution acidified with 7% hydrochloric acid to pH 2–3 to precipitate 34 g. (76%) of crude 2 - (p - acetamidobenzoyloxy) benzoic acid which had a light salmon color and M.P. 163–165° C. Digestion with boiling acetone-ethyl acetate improved the color and raised the M.P. to 192–193° C. Reprecipitation from dimethylformamide and water gave a white material but did not alter the melting point. The product gave a negative ninhydrin test for primary amine function.

Analysis (for $C_{16}H_{13}NO_5$).—Calculated (percent): C=64.21, H=4.38, N=4.68. Found (percent): C=64.05, H=4.52, N=4.81.

EXAMPLE II 2-(p-aminobenzoyloxy) benzoic acid

Alternatively, the 2-(p-aminobenzoyloxy) benzoic acid may be produced in accordance with this example [and then, if desired, further reacted in accordance with Example I to produce 2-(acetamidobenzoyloxy) benzoic acid].

46 g. of benzyl salicylate is dissolved in 170 ml. of dry pyridine and 43 g. of p-nitrobenzoyl chloride is added with stirring, allowing the temperature of the mixture to rise spontaneously from 20° to 60° C. The mixture is stirred for 2½ hours, poured into 1 liter of ice-water and the precipitate is filtered and washed with water. The damp filter-cake is suspended and stirred in 350 ml. of methanol, filtered, and washed with methanol to yield 74 g. of product.

40 g. of this product is suspended in 250 ml. of N,N-dimethylformamide containing 5 ml. of water and hydrogenated at 50 p.s.i.g./27° C. over 2 g. 10% palladium on charcoal. The theoretical amount of hydrogen is absorbed in about 60 minutes. The reaction mixture is filtered, and the filtrate diluted with 750 ml. of water to precipitate 24.6 g. (90%) of fine white crystals. After drying at 50° C. in vacuo, the product gives a negative phenolic test with $FeCl_3$.

The dried crude material is dissolved in boiling acetone (150 g. requires 1 liter), treated with activated charcoal and filtered. The acetone is distilled from the filtrate while adding benzene at a rate to maintain a constant volume and until the boiling point of the mixture reaches 70–75° C., whereupon the pure product crystallizes out. The mixture is filtered and the filter-cake washed with benzene, then dried at 50° C. in vacuo overnight, yielding 22 g. of pure 2-(p-aminobenzoyloxy) benzoic acid.

Analysis (for $C_{14}H_{10}NO_4$).—Calculated: C=65.4%, H=4.31%, N=5.45%, neutralization equivalent=257.2.

Found: C=65.5%, H=4.51%, N=5.65%, neutralization equivalent=258.5.

EXAMPLE III

2-(p-aminobenzoyloxy) benzoic acid

A modification of the method for the production of 2-(p-aminobenzoyloxy) benzoic acid is described in this example:

20.7 g. (0.15 m.) of salicylic acid was dissolved in 100 ml. of dry acetone and 21 ml. (0.17 m.) of N,N-dimethylaniline having an N-methylaniline content less than 0.2%. A solution of 28 g. (0.15 m.) of p-nitrobenzoyl chloride in 50 ml. of dry acetone was added slowly, while stirring the reaction mixture in a cold water bath. Addition was made at 17° to 25° C. requiring 10 minutes. (A deep red color developed at once, but no precipitate formed until about 15 minutes later.) The cold water bath was then removed, and stirring continued for 3½ hours; the red color faded and the reaction mixture gradually became thicker as more precipitate formed. The thick, creamy suspension was transferred to an open beaker, rinsing the flask with 20 ml. of acetone. Concentrated HCl (37%) 5 ml. (0.06 m.) was diluted with 95 ml. of cold water, and added slowly to the contents of the beaker with vigorous stirring while chilling in an ice bath. The precipitate was filtered off, and washed with 6× 25 ml. portions of water followed by 3× 25 ml. portions of benzene. Yield (after drying at 80° C./16 hours) was 38.6 g. (90%) of white powder, M.P.=183°–188° C.; gives negative tests with $AgNO_3$, $FeCl_3$. Neutralization equivalent=288.1 (theoretical=287.2).

30 g. (0.105 m.) of 2-(p-nitrobenzoyloxy) benzoic acid, suspended in 100 ml. of acetone containing 10 ml. of water and 1.5 g. (0.01 m.) of tartaric acid, was shaken with hydrogen over 0.90 g. of 5% palladium on charcoal. The reduction was carried out in a Parr low-pressure shaker at an initial pressure of 59 p.s.i.g. at 22° C. The hydrogen consumption reached 93% of theory in 15 minutes, and 95% in 45 minutes. The maximum temperature reached by the spontaneous warming of the mixture was 63° C. The catalyst was filtered off, and the filtrate diluted with 350 ml. of water while stirring. The precipitated product was filtered off, and washed with 3× 50 ml. of water followed by 3× 50 ml. benzene. Yield (after drying 16 hours at 50° C.) 22.8 g. (85%) of white crystalline powder, dec. pt. 175–180° C. (taken 1° per sec.); neutralization equivalent 265.5 (theory 257.2); gave negative phenolic test with $FeCl_3$.

EXAMPLE IV

2-(p-nitrobenzoyloxy) benzoic acid

The high yield production of 2-(p-nitrobenzoyloxy) benzoic acid as the intermediate for the production of the para compounds of this invention may be produced by this example.

28.8 g. of sodium salicylate (0.18 m., U.S.P. grade dried at 105° C.) was suspended in 125 ml. of dry acetone. A solution of 28 g. (0.15 m.) of p-nitrobenzoyl chloride in 50 ml. of dry acetone was added slowly while stirring in a cold water bath. The addition was made at 17° to 25° C. during 20 minutes; stirring was continued 16 hours at room temperature. The thick white suspension was transferred to a beaker with the aid of 25 ml. of acetone used to rinse the flask. Cold water, 450 ml., was added slowly with vigorous stirring. The precipitate was filtered off, and washed with 6× 25 ml. of water, then 4× 25 ml. of benzene. Yield (after drying at 80° C. under vacuum 4 hours) was 38.3 g. (89%) of white powder, M.P.=187°–191° C.; gave negative tests for chloride and free salicylic acid. Neutralization equivalent 298.2 (theory=287.2).

The 2-(p-aminobenzoyloxy) benzoic acid may be purified as in the following example.

EXAMPLE V

Purification of 2-(p-aminobenzoyloxy) benzoic acid 15 g. of crude 2-(p-aminobenzoyloxy) benzoic acid were dissolved in 60 ml. of 10:1 acetone-water at about 35° C. The solution was filtered and diluted with 120 ml. of water while stirring. The precipitated product was filtered off and washed with water. Yield (after drying 16 hours at 50° C.) 14.6 g. (97%), white powder, dec. pt. 175–180° C. (taken 1° per sec.),, neutralization equivalent 263.7 (theory 257.2).

It should be noted that in the hydrogenation step of Examples I–III, it is desirable to have a relatively small quantity of water present in order to obtain a higher yield and a purer product. Example III, for instance, shows that the 100 ml. of acetone contains 10 ml. of water, although the range could be from 5–20% based on the volume of acetone.

EXAMPLE VI

2-(m-aminobenzoyloxy) benzoic acid and 2-(m-acetamidobenzoyloxy) benzoic acid The 2-(m-aminobenzoyloxy )benzoic acid and 2-(m-acetamidobenzoyloxy) benzoic acid are prepared by the same processes as for the preparation of 2-(p-aminobenzoyloxy) benzoic acid and 2-(p-acetamidobenzoyloxy) benzoic acid described respectively in Examples I, II, III, and/or IV, except that m-nitrobenzoyl chloride is employed instead of p-nitrobenzoyl chloride. The resulting crude 2-(m-aminobenzoyloxy) benzoic acid produced may, if desired, be purified by the procedure described in Example V.

EXAMPLE VII

2-(o-aminobenzoyloxy) benzoic acid and 2-(o-acetamidobenzoyloxy) benzoic acid The 2-(o-aminobenzoyloxy) benzoic acid and 2-(o-acetamidobenzoyloxy) benzoic acid are prepared by the same processes as for the preparation of 2-(p-aminobenzoyloxy) benzoic acid and 2-(p-actamidobenzoyloxy) benzoic acid described respectively in Examples I, II, III and/or IV, except that o-nitrobenzoyl chloride is employed instead of p-nitrobenzoyl chloride. The resulting crude 2-(o-aminobenzoyloxy) benzoic acid produced may, if desired, be purified by the procedures described in Example V.

Although the compounds of this invention have analgesic and anti-inflammatory activity at doses which are not significantly ulcerogenic, manufacturing economics, among other considerations, would indicate a preference for the use of the 2-(aminobenzoyloxy) benzoic acids over the corresponding 2-(acetamidobenzyloxy) benzoic acids. Accordingly, the ulcerogenic effect and the pharmacological activity of certain 2-(aminobenzoyloxy) benzoic acids have been compared to aspirin and codeine and the results are presented below. In the tables, PAB indicates 2-(p-aminobenzoyloxy) benzoic acid.

TABLE 1

Acute toxicity

All drugs administered as a suspension in 1% carboxylmethyl-cellulose. Observation period=27 hours.

| Agent | Animal | Route | $LD_{50}$ (mg./kg.) (starved animals) |
|---|---|---|---|
| Aspirin | Mouse | Oral | 1,500 (1,340–1,680) |
| PAB | do | do | 2,800 (2,620–2,965) |
| Aspirin | do | I.P. | 480 (428–539) |
| PAB | do | I.P. | 1,180 (1,054–1,320) |
| Aspirin | Rat | Oral | 1,320 (1,179–1,479) |
| PAB | Rat | do | 3,000 (2,440–3,680) |
| Aspirin | Rat | I.P. | 630 (583–680) |
| PAB | Rat | I.P. | 1,240 (970–1,590) |

Thus it is apparent that the acute toxicity of PAB is much less than that of aspirin.

TABLE II

Analgesic effect—hot plate

Following pretreatment with the test drug, mice were placed on a hot plate maintained at 55° C. Untreated mice react by hopping and licking of their paws in response to the hot stimulus. The increase in pain threshold (average percent increase in reaction time) is then recorded at 1, 2 and 4 hour intervals after treatment.

| Agent | Dose, mg./kg. oral | Increase reaction time 1 | 2 | 4 |
|---|---|---|---|---|
| Codeine | 50 | 63 | 49 | 46 |
| | 100 | 83 | 71 | 59 |
| Aspirin | 200 | 33 | 11 | 9 |
| | 100 | 32 | 37 | 24 |
| PAB | 200 | 46 | 23 | 27 |
| | 400 | 44 | 41 | 23 |

Thus PAB has greater analgesic effect than aspirin.

TABLE III

Anti-inflammatory action—egg white edema (A) Single doses.—Female rats were pretreated with single oral doses of either PAB or aspirin, followed 4 or 6 hours later by intraplantar injections of egg-white or saline (control). Inhibition of the egg white edema was made by comparing leg weight differences between the treated and control animals.

| Agent | Dose, mg./kg. | Percent inhibition 4 | 6 |
|---|---|---|---|
| Aspirin | 200 | 35 | 35 |
| PAB | 400 | 26 | 28 |

(B) Multiple doses.—Pretreatment with either PAB or aspirin for three days prior to the induction of egg white edema resulted in inhibition of 15% or less for either compound which was not considered significant in this test system.

TABLE IV

Anti-inflammatory effects

Cotton pellet granuloma.—One sterile cotton pellet (6–8 mg.) was implanted subcutaneously in each groin area of female rats under either anesthesia. The drugs were then administered as single oral doses, daily, for three consecutive days. The granulomas were removed on the third day and the paired weights of granulomas from treated animals were compared with controls.

TABLE IV

| Agent | Dose, mg./kg. | Mean granuloma weights (mgs.) | Percent inhibition |
|---|---|---|---|
| Aspirin | 50 | 291 (180–430) | 28 |
| | 100 | 286 (239–364) | 29 |
| | 200 | 387 (251–345) | 29 |
| PAB | 100 | 285 (253–310) | 28 |
| | 200 | 248 (171–291) | 39 |
| | 400 | 270 (241–306) | 33 |
| Control | | 404 (343–457) | |

Thus the inhibition of inflammation with PAB compares favorably with aspirin.

TABLE V

Effect of PAB and aspirin on gastrointestinal bleeding

The experiments were conducted on albino male rats, weighing 150–180 gms., according to the method described by Y. Cohen (Isotopic Technics in Experimental Pharmacology, Roth, L. J., ed., The University of Chicago Press, Chicago, pp. 259–271).

Tagging of autotransfused erythrocytes.—One ml. of blood was withdrawn by cardiac puncture and mixed with one drop of heparin solution (50 mg./ml.). Twenty-five microcuries of $Na_2Cr^{51}O_4$ (in 0.5 ml. 0.9% NaCl) was added to the blood and the mixture incubated at 37° C. for 40 minutes. The cells were separated by centrifugation, washed three times with 0.9% NaCl and the final volume adjusted to one ml. and reinjected intracardially. The yield of in vitro tagging is approximately 50% and the half-life of the rat red cell is 8.0 days.

Dosage schedule.—Rats were divided into three groups of 5 rats and after autotransfusion of the tagged red blood cells, were placed in holding cages for 3 days. On the fourth day, one group received p-(2-aminobenzoyloxy) benzoic acid (355 mg./kg. equivalent to 191.0 mg./kg. of salicylic acid), the second group received aspirin (250 mg./kg. equivalent to 191.8 mg./kg. of salicylic acid) and the third group received 2% carboxymethylcellulose. Prior to administration of the salicylates, the animals were fasted for 24 hours. The salicylates were administered in 2% carboxymethylcellulose suspension (1 cc. volume) via a stomach tube, the rats were placed in metabolism cages and urine and feces collected over the duration of the experiment. The rats were allowed to take food 4 hours after the salicylate dosage.

An aliquot of the feces was analyzed after homogenization of the entire 24 hour collection. The radioactivity in counts per minute was corrected for physical decay of $Cr^{51}$ and for erythrocyte biological decay.

The results are shown in the following table:

TABLE V.—FECAL BLOOD LOSS (μl./DAY)

| Salicylate dose | 1 day | | 2 days | | 3 days [1] | |
|---|---|---|---|---|---|---|
| | PAB | ASP | PAB | ASP | PAB | ASP |
| First | 36 (14–62) | 67 (37–122) | 24 (16–31) | 57 (27–123) | 30 (18–45) | 23 (17–38) |
| Second | 41 (13–66) | 159 (62–182) | 55 (36–66) | 83 (52–116) | 50 (36–62) | 59 (44–76) |
| Mean [2] | 38.5 | 113 | 39.5 | 80 | 40 | 41 |

[1] Animals returned to normal fecal blood loss of 18–40 μl. per day on fourth day.
[2] Control group mean blood loss=27 μl. (18–40 μl.).

Thus the product produces a markedly lower degree of gastrointestinal bleeding than aspirin.

TABLE VI

Ulcerogenic effect

Equal numbers of male and female rats were administered daily single doses of the test compound by intubation for 5 consecutive days. On the 5th day, four or five hours after administration of the last dose of compound, each animal was sacrificed and the stomach removed. The stomachs were opened, flushed free of contents, and subsequently graded for the degree of ulceration or hemorrhagic involvement.

TABLE VI

| Compound | Dose, mg./kg. | Salicylic acid equivalent | Number rats | Degree of ulceration [1] (Number of animals) | | | | |
|---|---|---|---|---|---|---|---|---|
| | | | | 0 | I | II | III | IV |
| Aspirin | 125 | 95.88 | 20 | | | 5 | 7 | 8 |
| Do | 250 | 191.75 | 20 | | | 1 | 3 | 16 |
| PAB | 250 | 134.3 | 30 | 22 | 6 | | 1 | 1 |
| PAB | 500 | 268.5 | 30 | 11 | 12 | 4 | 3 | |

[1] Hemorrhagic score—0=Complete absence of hemorrhage; I=Very slight, 1-2 small areas; II=Slight, 3-4 mm. area; III=Moderate, 4 mm. area; IV=Severe, 75% of stomach involved.

Thus the product has a markedly lower ulcerogenic effect than aspirin.

The compounds of this invention are particularly useful for prolonged, continuous administration as a substitute for aspirin in order to effect a low degree in hemorrhage and ulceration while maintaining adequate salicylate blood levels for high analgesic and anti-inflammatory activity. While the dosage to be administered can be determined by a professional such as veterinarian, a daily dosage in divided portions for PAB, desirably, varies from 0.01 to 0.1 g. per kg. of body weight of a mammal. A preferred daily dosage of PAB is .05 g. per kg. of body weight, divided into four equal portions.

What is claimed is:
1. A compound having the formula:

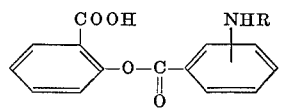

in which R is H or $COCH_3$.
2. The compound of claim 1 in which R is H.
3. The compound of claim 1 in which R is $COCH_3$.
4. 2-(p-Aminobenzoyloxy) benzoic acid.
5. 2-(m-Aminobenzoyloxy) benzoic acid.
6. 2-(o-Aminobenozyloxy) benzoic acid.
7. 2-(p-Acetamidobenzoyloxy) benzoic acid.
8. 2-(m-Acetamidobenzoyloxy) benzoic acid.
9. 2-(o-Acetamidobenzoyloyx) benzoic acid.

References Cited
UNITED STATES PATENTS
2,653,163  9/1953  Jacob _____ 260—471

OTHER REFERENCES
Morrison: Organic Chemistry (1959), Bacon/Allyn Co., p. 556.

LORRAINE A. WEINBERGER, Primary Examiner

E. J. GLEIMAN, Assistant Examiner

U.S. Cl. X.R.
424—310

UNITED STATES PATENT OFFICE
CERTIFICATE OF CORRECTION

Patent No. 3,642,865          Dated February 15, 1972

Inventor(s) Julius Diamond, et al

It is certified that error appears in the above-identified patent and that said Letters Patent are hereby corrected as shown below:

In the heading to the printed specification, line 6, "Diamond assignor" should read -- Diamond and Martin assignors --.

Signed and sealed this 7th day of November 1972.

(SEAL)
Attest:

EDWARD M. FLETCHER, JR.
Attesting Officer

ROBERT GOTTSCHALK
Commissioner of Patents